United States Patent
Oikawa et al.

(10) Patent No.: US 7,353,710 B2
(45) Date of Patent: Apr. 8, 2008

(54) PRESSURE SENSOR DEVICE WITH SURFACE ACOUSTIC WAVE ELEMENTS

(75) Inventors: Akira Oikawa, Kirishima (JP); Kaoru Matsuo, Kirishima (JP); Hiroshi Tachioka, Kirishima (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 10/580,899

(22) PCT Filed: Nov. 26, 2004

(86) PCT No.: PCT/JP2004/017981

§ 371 (c)(1),
(2), (4) Date: May 26, 2006

(87) PCT Pub. No.: WO2005/052534

PCT Pub. Date: Jun. 9, 2005

(65) Prior Publication Data

US 2007/0107522 A1   May 17, 2007

(30) Foreign Application Priority Data

Nov. 27, 2003  (JP) .............................. 2003-398183
Dec. 25, 2003  (JP) .............................. 2003-429373
Dec. 25, 2003  (JP) .............................. 2003-431596

(51) Int. Cl.
    *G01L 11/00* (2006.01)
(52) U.S. Cl. ......................... 73/703; 73/753
(58) Field of Classification Search ........... 73/700–756
    See application file for complete search history.

(56) References Cited

U.S. PATENT DOCUMENTS 4,295,102 A * 10/1981 Schmidt et al. ............ 331/65
6,003,378 A    12/1999 Scherr et al.
6,329,739 B1 * 12/2001 Sawano ................... 310/313 R
6,420,818 B1 *  7/2002 Kishimoto et al. ......... 310/324
6,754,950 B2 *  6/2004 Furukawa et al. ............ 29/832
6,998,926 B2 *  2/2006 Miyazaki et al. ............. 331/68
2002/0078741 A1 6/2002 Cantu et al.

FOREIGN PATENT DOCUMENTS

| JP | 59-017127   | 1/1984 |
| JP | 61-082130   | 4/1986 |
| JP | 10-104099   | 4/1998 |
| JP | 2002-264618 | 9/2002 |
| JP | 2003-501733 | 1/2003 |

* cited by examiner

Primary Examiner—Andre J. Allen
Assistant Examiner—Jermaine Jenkins
(74) Attorney, Agent, or Firm—Hogan & Hartson LLP

(57) ABSTRACT

Thickness of a pressure-detecting piezoelectric substrate (2) that is thinner than that of a supporting piezoelectric substrate (3) and that has a surface acoustic wave element for pressure detection (7a) on its lower surface is mounted on the supporting piezoelectric substrate (3) having a surface acoustic wave element for reference (4a) on its upper surface. A sealing member (5) is provided between the supporting piezoelectric substrate (3) and the pressure-detecting piezoelectric substrate (1). The surface acoustic wave element for pressure detection (7a) and the surface acoustic wave element for reference (4a) can be disposed in a space (S) enclosed with the pressure-detecting piezoelectric substrate (1) and the sealing member (5). It is possible to provide a small-sized pressure sensor device (1) that can perform temperature compensation and that has high reliability.

13 Claims, 10 Drawing Sheets

PRESSURE SENSOR DEVICE WITH SURFACE ACOUSTIC WAVE ELEMENTS

BACKGROUND OF THE INVENTION

1. Field of the Invention

This invention relates to a pressure sensor device for detecting gas or liquid pressure fluctuations and oscillating an electric signal, the pressure sensor device being used, for example, to monitor the air pressure of a tire.

2. Description of the Related Art

A device of a type that detects the fluctuation of applied pressure as a change in oscillation frequency has been conventionally used as a pressure sensor device for detecting gas or liquid pressure fluctuations.

As an example of this type of conventional pressure sensor device, there is known a pressure sensor device having a structure in which surface acoustic wave elements 54 and a surface acoustic wave element 57 each of which is formed of a pectinate electrode are disposed on a piezoelectric substrate 51, and in which a region where the surface acoustic wave element 54 is formed is set to be thinner in thickness than a region where the surface acoustic wave element 57 is formed, as shown in FIG. 17 and FIG. 18 (see Japanese Unexamined Patent Publication No. 61-82130 (1986), for example).

In this conventional pressure sensor device, the surface stress of the piezoelectric substrate 51 is changed by having received pressure in the surface acoustic wave element 54 formed in the region whose thickness is made thinner, and the acoustic velocity of surface acoustic waves varies, and, at the same time, a distance between the electrodes of the surface acoustic wave elements 54 varies. Accordingly, the resonance frequency of the surface acoustic wave elements 54 varies, and pressure can be detected by a change in the resonance frequency.

The conventional pressure sensor device also has a function to make temperature compensation in accordance with a change in the resonance frequency of the surface acoustic wave element 57 disposed on the same piezoelectric substrate.

However, the conventional pressure sensor device has a conventional problem in the fact that the surface acoustic wave element 57 and the surface acoustic wave element 54 are formed in the same area on the surface of the piezoelectric substrate 51, and hence the area of the piezoelectric substrate is enlarged, thus making it difficult to achieve a size reduction. The conventional pressure sensor device has another conventional problem in the fact that, although the piezoelectric substrate 51 partly has a thin part, a large area for the thin part cannot be secured when the pressure sensor device must be reduced, for example, in size, and therefore the amount of deformation obtained by receiving pressure is small, and high sensitivity cannot be obtained as a pressure sensor device.

It is an object of the present invention to provide a pressure sensor device that can improve its sensitivity by enlarging the deformation of a surface acoustic wave element when pressure is received, that can be reduced in size, and that has high reliability.

SUMMARY OF THE INVENTION

A pressure sensor device of the present invention is characterized in that the pressure sensor device comprises a first piezoelectric substrate having a surface acoustic wave element for reference formed on an upper surface thereof, a second piezoelectric substrate that is thinner in thickness than the first piezoelectric substrate and having a surface acoustic wave element for pressure detection formed on a lower surface thereof, a sealing member to be joined to the upper surface of the first piezoelectric substrate and to the lower surface of the second piezoelectric substrate so as to form a space enclosed by the sealing member between the first piezoelectric substrate and the second piezoelectric substrate.

According to this pressure sensor device, since the thickness of the second piezoelectric substrate having the surface acoustic wave element for pressure detection is made thinner as a whole than the thickness of the first piezoelectric substrate having the surface acoustic wave element for reference, the deformation of the surface acoustic wave element for pressure detection is enlarged when pressure is received, and hence high sensitivity can be obtained as a pressure sensor device.

Additionally, the pressure applied to the second piezoelectric substrate can be detected with reference to an output signal of the surface acoustic wave element for pressure based on an output signal of the surface acoustic wave element for reference.

Additionally, the surface acoustic wave element for reference and the surface acoustic wave element for pressure detection are disposed on the mutually different piezoelectric substrates in the state of allowing at least a part of the surface acoustic wave element for reference is opposed to the surface acoustic wave element for pressure detection. As a result, the area that the both surface acoustic wave elements are formed can be reduced in comparison to the case where the both elements are disposed on the same surface viewed in plan, and hence the size reduction can be achieved.

Additionally, the deformation of the surface acoustic wave element for pressure detection and the deformation of the surface acoustic wave element for reference are offset, and temperature compensation can be performed by subjecting an output signal of the surface acoustic wave element for reference and an output signal of the surface acoustic wave element for pressure detection to signal processing. Therefore, accuracy in pressure detection can be improved without receiving temperature influence.

Further, preferably, thermal expansion coefficients in at least one direction of the first piezoelectric substrate and the second piezoelectric substrate are substantially the same. Since thermal expansion coefficients in a same direction of both piezoelectric substrates are equalized by this arrangement, a defect, such as the occurrence of a crack, caused by the application of a heat history can be reduced when the second piezoelectric substrate is disposed on the first piezoelectric substrate.

Additionally, preferably, the first piezoelectric substrate and the second piezoelectric substrate are made of piezoelectric single crystals having the same composition, and cut angles of both of the piezoelectric substrates and propagating directions of surface acoustic waves with respect to the crystal axis of the piezoelectric crystal are substantially the same or are crystallographically equivalent to each other. This structure makes it possible to cause a temperature characteristic of the surface acoustic wave element for reference and a temperature characteristic of the surface acoustic wave element for pressure detection to substantially coincide with each other, and makes it possible to easily perform temperature compensation using the surface acoustic wave element for reference.

Further, if the sealing member in the pressure sensor device of the present invention is made of a conductive material and is electrically connected to a ground terminal provided on the lower surface of the first piezoelectric substrate, electromagnetical shield ability of the surface acoustic wave element for reference and the surface acoustic wave element for pressure detection can be improved, and the sensitivity of pressure detection can be raised.

Additionally, if the pressure sensor device of the present invention has a structure in which an electrode pad electrically connected to the surface acoustic wave element for pressure detection is provided on the lower surface of the second piezoelectric substrate inside the sealing member and in which a connection pad electrically connected to the electrode pad via a conductive bonding material is provided on the upper surface of the first piezoelectric substrate within the space enclosed by the sealing member, an electrically connecting portion between both elements, as well as the surface acoustic wave element for reference and the surface acoustic wave element for pressure detection, can be electromagnetically shielded, and can be excellently protected from an external environment.

Moreover, when the above-described pressure sensor device is attached to a movable body, electric power necessary to actuate the oscillating circuit thereof is supplied from a power supply means such as a battery. In this case, there arises the disadvantage that power consumption will be raised, and the lifetime of the battery will be shortened if the pressure sensor device is in a state in which electric power is always supplied from an electric power source to the oscillating circuit.

Therefore, in order to restrict power consumption, a pressure sensor device is known in which electric power is supplied to an oscillating circuit by detecting acceleration generated by the movement of a movable body only when the movable body travels at more than a predetermined speed, whereas the electric power supply to the oscillating circuit is turned off when the movable body is stopped or when the movable body travels at less than the predetermined speed, thus restricting the power consumption of the oscillating circuit (see Japanese Unexamined Patent Publication No. 2002-264618, for example).

However, since the conventional pressure sensor device is constructed by mounting a pressure sensor and an acceleration sensor individually, the unit size of these is enlarged. Additionally, since the conventional pressure sensor device is required to have an assembling operation for the pressure sensor and an assembling operation for the acceleration sensor, a decrease in productivity is caused.

Therefore, the pressure sensor device of the present invention is structured such that an extended portion is formed in a state in which the side of one end of the first or second piezoelectric substrate is disposed apart from the other supporting piezoelectric substrate, and an acceleration detecting element that detects acceleration is added to the extended portion. According to this structure, acceleration can be detected without separately preparing a substrate for the acceleration detecting element. Therefore, the number of components can be reduced, and the pressure sensor device can be reduced in size and weight.

Preferably, the extended portion may be formed on the second piezoelectric substrate that is thinner than the first piezoelectric substrate. In this case, application of acceleration results in bendability, which improves detection sensitivity of the acceleration.

Preferably, the pressure sensor device of the present invention includes an oscillating circuit that oscillates a pressure detection signal to the out based on output signals from the surface acoustic wave elements for reference and for pressure detection, an acceleration detecting circuit that emits a predetermined electric signal based on an acceleration detection signal transmitted from the acceleration detecting element, a power supply means for supplying electric power to the oscillating circuit, and a power supply control circuit that controls an electric power supply from the power supply means to the oscillating circuit, wherein the power supply control circuit controls an electric power supply from the power supply means to a power amplifier based on whether the acceleration has exceeded a threshold value or not.

This control makes it possible to detect pressure when the movable body is traveling and only when acceleration is being sensed. Therefore, the life of the electric power source can be lengthened while restricting wasteful power consumption of the power amplifier.

Additionally, since the pressure detecting element and the acceleration detecting element can be simultaneously constructed by the same producing step if the acceleration detecting element is formed of the surface acoustic wave element, the producing process can be shortened, and productivity can be improved.

Additionally, since an oscillation signal output from the oscillating circuit can be wirelessly transmitted to other apparatuses having a receiving circuit if an antenna pattern electrically connected to the oscillating circuit is provided on the supporting piezoelectric substrate or on the pressure-detecting piezoelectric substrate, pressure information can be obtained even at a place remote from the pressure sensor device.

In particular, when the antenna pattern is structured to be attached to the upper surface of the second piezoelectric substrate, the oscillating circuit and the antenna pattern are disposed close to each other, and therefore a wiring portion by which the oscillating circuit and the antenna pattern are connected to each other can be shortened. As a result, the influence of transmission loss caused by the wiring portion becomes small, and an electric signal can be transmitted without being attenuated. Therefore, the power consumption of the battery can be reduced, and pressure information can be wirelessly transmitted more reliably to other receiving machines while increasing the output level of an oscillation signal output from the oscillating circuit.

Preferably, the antenna pattern is formed on the upper surface of the pressure-detecting piezoelectric substrate excluding an area just above the surface acoustic wave element for pressure detection.

The effective length of the antenna pattern can be lengthened by meanderingly forming the antenna pattern, and the antenna gain can be raised.

DESCRIPTION OF THE PREFERRED EMBODIMENTS

Embodiments of the present invention will be hereinafter described in detail with reference to the accompanying drawings.

Figure 1:
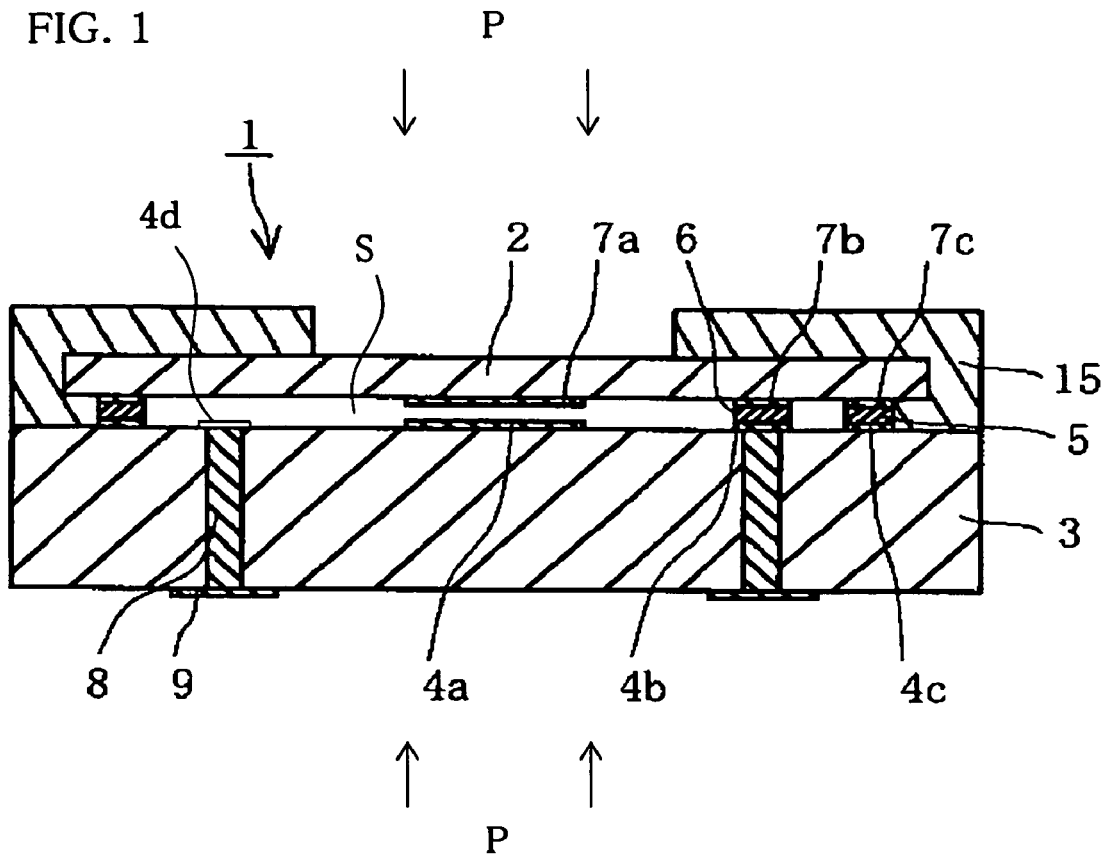
FIG. 1 is a sectional view of a pressure sensor device according to an embodiment of the present invention.
Figure 2:
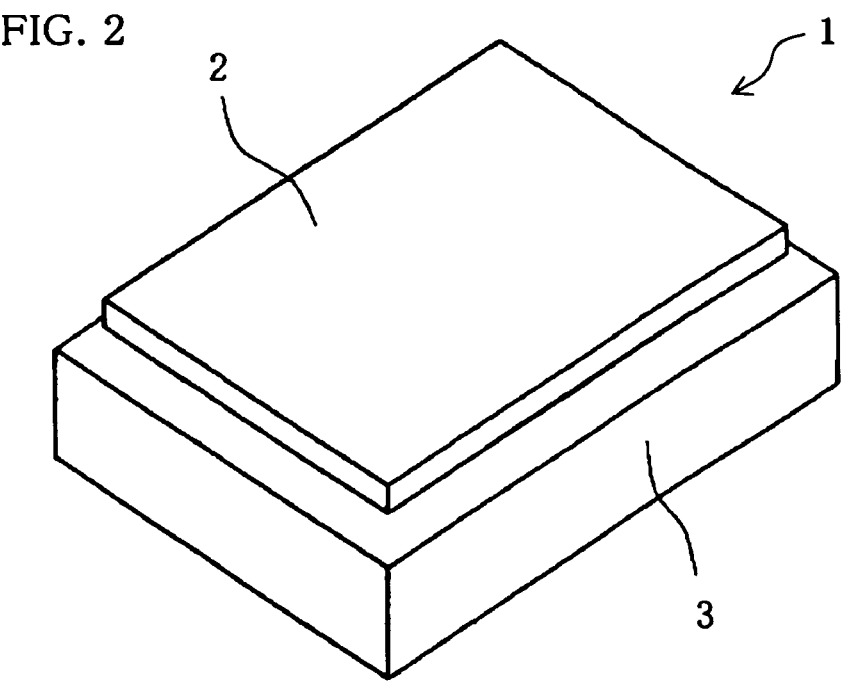
FIG. 2 is an external perspective view of the pressure sensor device.
Figure 3:
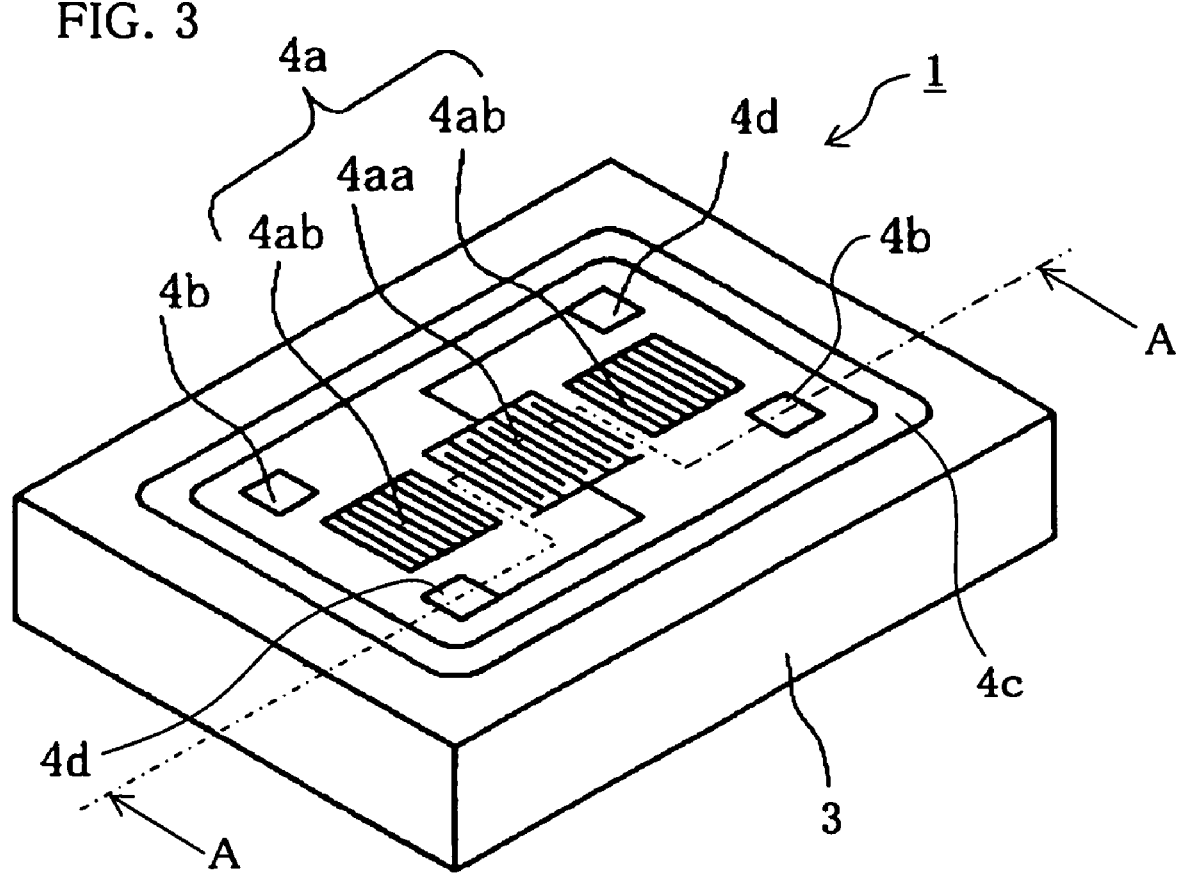
FIG. 3 is an external perspective view of a supporting piezoelectric substrate of the pressure sensor device.

FIG. 1 is a sectional view of a pressure sensor device 1 according to an embodiment of the present invention, and FIG. 2 is an external perspective view of the pressure sensor device. FIG. 3 is an external perspective view showing a structure of a surface acoustic wave element for reference disposed on a supporting piezoelectric substrate used in the pressure sensor device 1.

FIG. 1 is a sectional view of the supporting piezoelectric substrate 3 taken along line A-A of FIG. 3. The protecting material 15 in FIG. 2 is omitted.

FIG. 1 is a sectional view of the supporting piezoelectric substrate 3 taken along line A-A of FIG. 3. The protecting material 15 in FIG. 2 is omitted.

The pressure sensor device 1 is chiefly made up of the supporting piezoelectric substrate 3 provided with a surface acoustic wave element for reference 4a, a pressure-detecting piezoelectric substrate 2 provided with a surface acoustic wave element for pressure detection 7a, a sealing member 5, and a conductive bonding material 6.

The supporting piezoelectric substrate 3 corresponds to a first piezoelectric substrate, and the pressure-detecting piezoelectric substrate 2 corresponds to a second piezoelectric substrate.

The supporting piezoelectric substrate 3 is made of a single crystal (hereinafter, referred to as a "piezoelectric crystal"), such as quartz crystal, lithium niobate, or lithium tantalate, that exhibits piezoelectric properties. The main surface of the supporting piezoelectric substrate 3 is formed by cutting a piezoelectric-crystal ingot at a predetermined cut angle.

The surface acoustic wave element for reference 4a and a connection pad 4b are adhered to the upper surface of the supporting piezoelectric substrate 3, and an external terminal 9 is adhered to the lower surface thereof. A via hole conductor 8 is formed for electrically connecting the upper and lower surfaces of the supporting piezoelectric substrate 3 together.

The surface acoustic wave element for reference 4a is a surface acoustic wave type resonator that resonates at a predetermined frequency. The surface acoustic wave element for reference 4a is made up of an interdigital transducer (hereinafter, abbreviated as an "IDT") 4aa formed on the surface of the piezoelectric substrate 1 and a reflector 4ab formed on both sides in the propagating direction of the surface acoustic wave of the IDT 4aa. The IDT 4aa and the reflector 4ab are formed such that a metallic material, such as aluminum or gold, is adhered to the surface of the piezoelectric substrate 1 according to a film forming method, by a sputtering method or a vapor deposition method, and a pattern formation is applied thereto with a thickness of about 2000 Å through a photolithography process or a similar process.

The connection pad 4b and the external terminal 9 can be formed according to the same material and same producing method as the IDT 4aa and the reflector 4ab. Preferably, the film is formed to be thicker in order to heighten the adhesion.

The via hole conductor 8 is formed such that a hole that passes through the supporting piezoelectric substrate 3 is formed according to a sandblast method or the like, and the inner surface of the hole is then plated with Ni, Cu, or Au.

The electrode 4d shown in FIG. 3 is a land by which the surface acoustic wave element for reference 4a and the via hole conductor 8 are connected together.

The pressure-detecting piezoelectric substrate 2 is made of a piezoelectric crystal having the same composition as the supporting piezoelectric substrate 3, and is formed to be substantially the same or be crystallographically equivalent to the supporting piezoelectric substrate 3 in the cut angle and in the propagating direction of a surface acoustic wave with respect to the crystal axis of the piezoelectric crystal. Herein, the phrase "substantially the same" means that a case in which there is a deviation within the range of ±0.5° is included besides the case of being completely the same. The phrase "crystallographically equivalent" in the cut angle means that the main surface of the piezoelectric substrate that has been cut out by the cutting operation is a crystallographically equivalent surface. The "crystallographically equivalent surface" is a surface that becomes equivalent by the symmetric property of a crystal. Likewise, the "crystallographically equivalent" direction is a direction that becomes equivalent by the symmetric property of a crystal. For example, in LBO ($Li_2B_4O_7$) that is tetragonal, an X surface and a Y surface are equivalent, and an X direction and a Y direction are equivalent, for example.

When the pressure-detecting piezoelectric substrate 2 is mounted on the supporting piezoelectric substrate 3, both the substrates are arranged so that the directions of corresponding crystal axes of the piezoelectric crystal of the substrates become substantially parallel to each other. As a result, thermal expansion coefficients in an arbitrary direction of both substrates become equal to each other, and therefore, for example, when the pressure-detecting piezoelectric substrate 2 is mounted on the supporting piezoelectric substrate 3, it is possible to effectively prevent a defect, such as the occurrence of a crack, resulting from a large stress generated in the joint portion because of a difference in the thermal expansion coefficient when a great change in temperature occurs. Herein, the phrase "substantially parallel" means that a case in which there is a deviation in the crystal axis within the range of ±0.5° is included besides the case of being completely parallel.

The lower surface of the pressure-detecting piezoelectric substrate 2 is structured such that the surface acoustic wave element for pressure detection 7a and an electrode pad 7b are adhered to the lower surface thereof.

The pressure-detecting piezoelectric substrate 2 is formed to be thinner in thickness than the supporting piezoelectric substrate. For example, the supporting piezoelectric substrate 3 is formed to have a thickness of 200 μm to 300 μm, whereas the pressure-detecting piezoelectric substrate is formed to have a thickness of 50 μm to 75 μm. The reason why the pressure-detecting piezoelectric substrate is made thinner in thickness is to detect a net pressure fluctuation by setting the amount of deformation of the pressure-detecting piezoelectric substrate 2 caused when pressure is received to become larger than that of the supporting piezoelectric substrate 3.

Like the surface acoustic wave element for reference 4a, the surface acoustic wave element for pressure detection 7a is a surface acoustic wave resonator composed of an IDT and a pair of reflectors formed on both sides in the propagating direction of a surface acoustic wave of the IDT. The resonance frequency of the surface acoustic wave element for pressure detection 7a is also caused to coincide with that of the surface acoustic wave element for reference 4a.

The electrode pad 7b is used to be electrically connected to the connection pad 4b via a conductive bonding material 6 described later, and it is preferable to form the electrode pad 7b to become thicker in thickness in the same way as the connection pad 4b.

For example, a solder or AuSn that is a high-melting point brazing material can be used for the conductive bonding material 6. Even when heat is applied in a step of mounting the pressure sensor device 1 on a motherboard or the like, it is recommended to use AuSn that is a brazing material having a high melting point so that characteristics cannot be changed by the re-melt of the conductive bonding material 6.

It is permissible to use not only AuSn but also AuSi or SnAgCu, because the same effect can be obtained.

The sealing member 5 is additionally interposed between the supporting piezoelectric substrate 3 and the pressure-detecting piezoelectric substrate 2 in such a way as to encircle the surface acoustic wave element for reference 4a, the surface acoustic wave element for pressure detection 7a, the connection pad 4b, and the electrode pad 7b. The sealing member 5 serves as a spacer.

Resin or a conductive material may be used for the sealing member 5.

If the sealing member 5 is shaped like a frame so as to surround the surface acoustic wave element for reference 4a and the surface acoustic wave element for pressure detection 7a, the surface acoustic wave element for reference 4a, the surface acoustic wave element for pressure detection 7a, etc., can be hermetically sealed inside this frame, i.e., in an area (hereinafter, referred to as a "sealed space S") enclosed by the pressure-detecting piezoelectric substrate 2, the supporting piezoelectric substrate 3, and the sealing member 5. As a result, an IDT electrode and other components disposed in the sealed space S can be prevented from being oxidized or corroded. Therefore, preferably, the sealing member 5 is shaped like a frame.

Additionally, when the pressure sensor device 1 is being used, the sealing member 5 is kept at ground potential by making the sealing member 5 out of a conductive material, such as a solder, and by connecting the sealing member 5 to a ground terminal of the external terminal electrode 9 disposed on the lower surface of the supporting substrate. Therefore, advantageously, shieldability can be improved. From this shielding effect, unnecessary noise from the outside can be excellently lowered with the sealing member 5.

Additionally, since the heat conduction between the supporting piezoelectric substrate 3 and the pressure-detecting piezoelectric substrate 2 can be improved by using a conductive material for the sealing member 5 in cooperation with the shielding effect, the surface acoustic wave element for pressure detection 7a and the surface acoustic wave element for reference 4a can be substantially equalized in temperature, and temperature compensation can be easily performed as described later.

Preferably, the area enclosed with the pressure-detecting piezoelectric substrate 2, the supporting piezoelectric substrate 3, and the sealing member 5 is filled with an inert gas such as a nitrogen gas or an argon gas. This makes it possible to more effectively prevent the IDT electrode and the like from being oxidized or corroded.

Advantages of the pressure sensor device 1 in this embodiment will be hereinafter described.

The pressure-detecting piezoelectric substrate 2 that has been thinned is deformed when pressure is received from the outside. As a result, the propagation speed of a surface acoustic wave at a part where a distortion has been caused varies, and the distance between electrode fingers of the IDT of the surface acoustic wave element for pressure detection 7a varies, and, accordingly, the resonance frequency varies by being affected by these variations. Therefore, a pressure fluctuation can be detected according to a variation in the resonance frequency of the surface acoustic wave element 7a.

Generally, the surface acoustic wave element 7a has a predetermined temperature characteristic in this case, and the resonance frequency thereof is drifted by a temperature change.

Therefore, there is a need to remove the influence of a drift caused by a temperature change, and, to do so, the surface acoustic wave element for reference 4a is used. In other words, since the surface acoustic wave element for reference 4a is formed to be thick, this element is not easily deformed as described above even when pressure is received from the outside. Therefore, the resonance frequency thereof varies in accordance with only a temperature change. By employing this, the change data concerning the resonance frequency of the surface acoustic wave element for pressure detection 7a can be corrected, and the influence exerted by a temperature change can be almost removed.

Herein, if there is a difference in temperature characteristics between the surface acoustic wave element for pressure detection 7a and the surface acoustic wave element for reference 4a, the temperature is calculated by a comparison between the data of the resonance frequency of the surface acoustic wave element for reference 4a and the temperature characteristic data, and then a change in the resonance frequency caused by the temperature of the surface acoustic wave element for pressure detection 7a is calculated by a comparison between this temperature data and the temperature data concerning the surface acoustic wave element for pressure detection 7a, and the influence caused by the temperature change must be removed by using the results.

On the other hand, in the pressure sensor device 1 of this embodiment, the supporting piezoelectric substrate 3 and the pressure-detecting piezoelectric substrate 2 are made of the same piezoelectric crystal, and both of the piezoelectric substrates are made substantially the same or made crystallographically equivalent in the cut angle and in the propagating direction of a surface acoustic wave with respect to the crystal axis of a piezoelectric crystal, thereby allowing the surface acoustic wave element for reference 4a and the surface acoustic wave element for pressure detection 7a to coincide with each other in "resonance frequency characteristics with respect to temperature." Therefore, as a result of disposing these piezoelectric substrates so that the temperature of the surface acoustic wave element for pressure detection 7a becomes approximately equal to the temperature of the surface acoustic wave element for reference 4a, both of the surface acoustic wave elements become equal in the variation quantity of the resonance frequency caused by a temperature change occurring in the pressure sensor device 1. Therefore, the influence caused by the temperature change can be almost removed only by taking a difference between the resonance frequency of the surface acoustic wave element for pressure detection 7a and the resonance frequency of the surface acoustic wave element for reference 4a. Thus, temperature compensation can be realized by a very simple structure and method.

For example, an oscillating circuit that oscillates at a frequency corresponding to the surface acoustic wave element for pressure detection 7a is formed to realize temperature compensation. Thus, a pressure fluctuation of the surface acoustic wave element for pressure detection 7a can be detected as a change in oscillation frequency. The surface acoustic wave element for reference 4a is connected to another oscillating circuit that oscillates at a frequency corresponding to the surface acoustic wave element for reference 4a in the same way. The influence caused by a temperature change can be almost removed with ease by entering the outputs of these oscillating circuits into a mixer circuit and outputting a signal of frequency corresponding to a difference between both frequencies of these oscillating circuits. As a result, a net pressure fluctuation can be detected.

In particular, in the pressure sensor device 1 of this embodiment, since the thickness of the pressure-detecting piezoelectric substrate 2 provided with the surface acoustic wave element for pressure detection 7a is thinner on the whole than the thickness of the supporting piezoelectric substrate 3 having the surface acoustic wave element for reference 4a, the deformation amount of the pressure-detecting piezoelectric substrate 2 and the deformation amount of the surface acoustic wave element for pressure detection 7a become larger when pressure is received, and high sensitivity can be obtained as the pressure sensor device 1.

In addition to this, the surface acoustic wave element for reference 4a and the surface acoustic wave element for pressure detection 7a face each other, and are disposed on the mutually different piezoelectric substrates. Therefore, there is no need to form two electrodes on the same surface, and the area of the piezoelectric substrate can be reduced, whereby the pressure sensor device 1 can be reduced in size.

Additionally, in the pressure sensor device 1 of this embodiment, the supporting piezoelectric substrate 3 and the pressure-detecting piezoelectric substrate 2 are made of the same piezoelectric crystal and are disposed so that the direction of a corresponding crystal axis of the piezoelectric crystal of the supporting piezoelectric crystal 3 becomes substantially parallel to that of the pressure-detecting piezoelectric substrate 2. Therefore, since the thermal expansion coefficients in the same arbitrary direction of the two piezoelectric substrates become equal to each other, a defect, such as the occurrence of a crack, caused by the application of a heat history is reduced.

Additionally, in the pressure sensor device 1 of this embodiment, the supporting piezoelectric substrate 3 and the pressure-detecting piezoelectric substrate 2 are made of the same piezoelectric crystal and are formed so as to be substantially the same or be crystallographically equivalent in the cut angle and in the propagating direction of a surface acoustic wave with respect to the crystal axis of the piezoelectric crystal. Therefore, the temperature characteristic of the surface acoustic wave element for reference 4a can be caused to coincide with that of the surface acoustic wave element for pressure detection 7a, and the detected temperature of the surface acoustic wave element for pressure detection 7a is substantially equalized with that of the surface acoustic wave element for reference 4a. Therefore, temperature compensation can be realized by a very simple structure and method.

Still additionally, since the surface acoustic wave element for reference 4a and the surface acoustic wave element for pressure detection 7a are disposed in a space sealed by the sealing member 5, the two elements and an electrically connecting portion between the elements can be excellently protected from an external environment.

Next, a description will be given of a method for connecting the supporting piezoelectric substrate 3 and the pressure-detecting piezoelectric substrate 2 together.

First, preparation is made of a first wafer having the surface acoustic wave element for reference 4a and the connection pad 4b on its upper surface and a second wafer having the surface acoustic wave element for pressure detection 7a and the electrode pad 7b on its lower surface. The first wafer used herein is an aggregated substrate of the supporting piezoelectric substrate 3, and the second wafer is an aggregated substrate of the pressure-detecting piezoelectric substrate 2. Each substrate has a thickness of 200 μm to 300 μm.

Thereafter, the connection pad 4b of the first wafer and the electrode pad 7b of the second wafer are temporarily connected together with a solder paste, and the sealing pad 4c of the first wafer and the sealing electrode 7c of the second wafer are temporarily connected together with a solder paste. In this embodiment, a paste produced by dispersing AuSn powder into an organic vehicle is used as the solder paste. The solder paste is applied and formed onto the connection pad 4b and the sealing pad, for example, according to a well-known screen printing method.

Thereafter, each electrode pad 7b and each sealing electrode 7c of the second wafer are caused to face each connection pad 4b and each sealing pad 4c corresponding thereto. At this time, the first wafer and the second wafer are caused to coincide with each other in the direction of a corresponding crystal axis.

Thereafter, the solder paste is melted while heating the first and second wafers.

The surface acoustic wave element for reference 4a and the surface acoustic wave element for pressure detection 7a are surrounded with the sealing member 5 in this way, and each connection pad 4b is electrically connected to each electrode pad 7b via the conductive bonding material 6.

The second wafer fixed to the first wafer in this way is ground from the upper side by, for example, lapping so as to have a thickness of 50 μm to 75 μm.

Thereafter, only the second wafer is cut by dicing, and the second wafer is divided into a plurality of pressure-detecting piezoelectric substrates. A liquid resin is then applied in such a way as to fill gaps between adjoining pressure-detecting piezoelectric substrates and is thermally hardened. In this embodiment, it is recommended to use a vacuum printing method, because the gaps must be effectively filled when the liquid resin is applied.

The first wafer and the resin are then cut, for example, by dicing. A pressure sensor device 1 having a supporting piezoelectric substrate 3 obtained by the dividing operation in this way is produced. The above-described resin functions as a protecting material 15 that protects an end face of the thin pressure-detecting piezoelectric substrate 2.

The thus structured pressure sensor device 1 is connected to, for example, the oscillating circuit 80 and is combined with a power amplifier, an electric power source, and an antenna. As a result, for example, the pressure sensor device 1 can be used as a sensor device that is attached to a tire of a vehicle and transmits a radio signal in accordance with a change in the air pressure of the tire.

Figure 4:
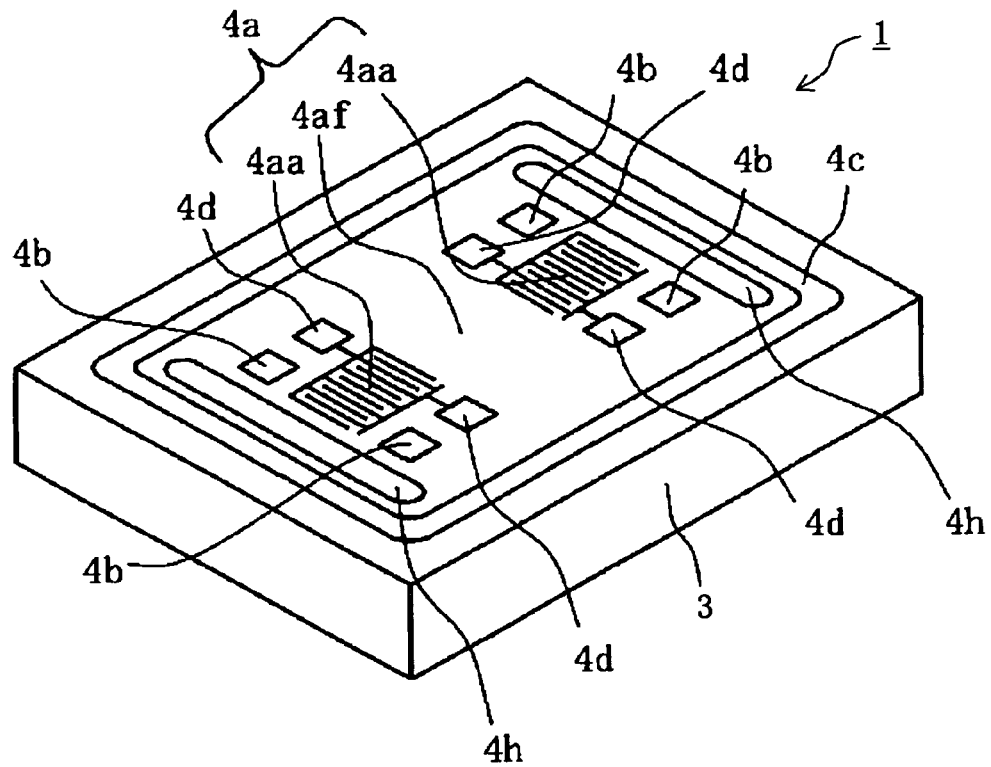
FIG. 4 is an external perspective view of another supporting piezoelectric substrate of the pressure sensor device.

Referring now to FIG. 4, a description will be given of a pressure sensor device 1 using a surface acoustic wave delay line as the surface acoustic wave element. In this embodiment, only respects different from those of the embodiment described with reference to FIG. 1 through FIG. 3 will be described, and an overlapping description will be omitted by giving the same reference symbols to the same constituent elements.

FIG. 4 is an external perspective view showing a supporting piezoelectric substrate 3 used in the pressure sensor device 1 of this embodiment.

The pressure sensor device 1 of this embodiment differs from the pressure sensor device described with reference to FIG. 1 through FIG. 3 in the fact that the surface acoustic wave element for reference 4a is formed as a surface acoustic wave delay line. In more detail, the surface acoustic wave element for reference 4a is made up of a pair of IDT electrodes 4aa arranged with an interval on the surface of the sensor substrate 1 and a propagation path 4af of a surface acoustic wave disposed between the IDT electrodes 4aa.

Likewise, the surface acoustic wave element for pressure detection 7a of the pressure-detecting piezoelectric substrate 2 is a type of surface acoustic wave delay line. That is, the surface acoustic wave element for pressure detection 7a is made up of a pair of IDTs arranged with a predetermined interval on the lower surface of the pressure-detecting piezoelectric substrate 2 and a propagation path disposed between the IDTs. In order to dampen a surface acoustic wave and prevent the surface acoustic wave from being reflected, for example, at the end of the piezoelectric substrate, a damping material 4h made of silicone resin or the like is formed on each side in the propagating direction of a surface acoustic wave of each surface acoustic wave element.

When the pressure-detecting piezoelectric substrate 2 is deformed by applying pressure to the pressure-detecting piezoelectric substrate 2 from the outside, the length of the propagation path of a surface acoustic wave varies in the surface acoustic wave element for pressure detection 7a. At the same time, the propagation speed of a surface acoustic wave of a part where a distortion has occurred varies, and the delay time of an electric signal varies by being affected by both the length of the propagation path and the propagation speed. Therefore, a pressure fluctuation can be detected by detecting a change in the delay time in the same way as in the previous embodiment.

In order to detect a change in the delay time, an oscillating circuit is formed which oscillates at a frequency corresponding to, for example, the delay time of an electric signal generated by the surface acoustic wave delay line of the surface acoustic wave element for pressure detection 7a. A pressure fluctuation can be detected as a change in the oscillation frequency by means of the oscillating circuit.

Likewise, in the surface acoustic wave element for reference 4a, an oscillating circuit is formed which oscillates at a frequency corresponding to the delay time of an electric signal generated by the surface acoustic wave element for reference 4a.

Influences caused by a temperature change can be almost removed with ease by outputting a signal of a frequency corresponding to a difference in frequency between these oscillating circuits.

As in the previous embodiment, the influence caused by a temperature change can be almost removed with ease by entering the outputs of these two oscillating circuits into a mixer circuit and outputting a signal of frequency corresponding to a difference between both frequencies of these oscillating circuits. As a result, a net pressure fluctuation can be detected.

Next, with reference to the attached drawings, a detailed description will be given of a pressure sensor device 1 in which an acceleration sensor is added to the pressure sensor device 1 mentioned above.

Figure 5:
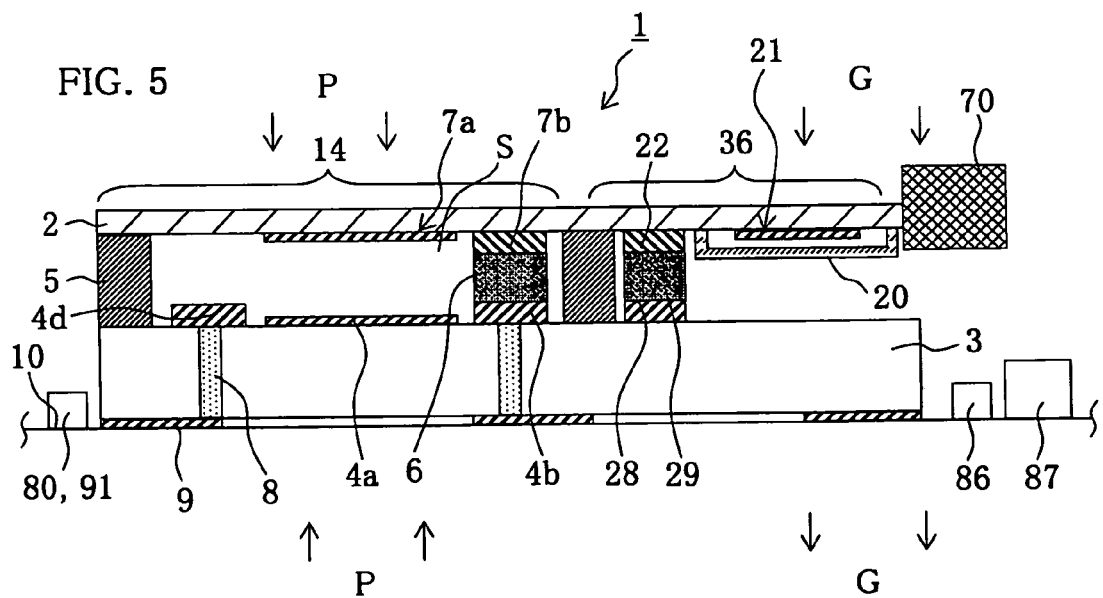
FIG. 5 is a sectional view of a pressure sensor device provided with an acceleration detecting sensor according to another embodiment of the present invention.
Figure 6:
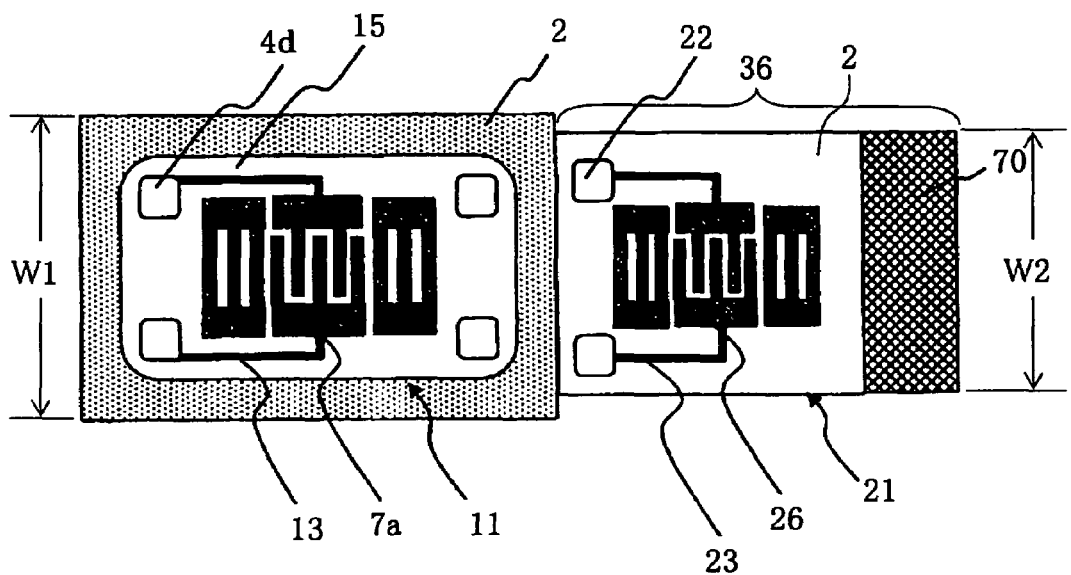
FIG. 6 is a plan view showing the lower surface of a pressure-detecting piezoelectric substrate 2 used in the pressure sensor device of FIG. 5.

FIG. 5 is a sectional view of a pressure sensor device 1 provided with an acceleration sensor. FIG. 6 is a plan view showing the lower surface of a pressure-detecting piezoelectric substrate 2 used in the pressure sensor device 1 provided with the acceleration sensor.

The pressure sensor device 1 shown in these figures is mainly made up of a supporting piezoelectric substrate 3 on which a surface acoustic wave element for reference 4a is mounted, the pressure-detecting piezoelectric substrate 2 on which a surface acoustic wave element for pressure detection 7a and an acceleration detecting element 21 are mounted, a sealing member 5, and a conductive bonding material 6.

The material quality and crystal cutting direction of the pressure-detecting piezoelectric substrate 2, the structure of the surface acoustic wave element for pressure detection 7a and the structure of the electrode pad 7b that are formed on the pressure-detecting piezoelectric substrate 2, the material quality and crystal cutting direction of the supporting piezoelectric substrate 3, the structure of the surface acoustic wave element for reference 4a and the structure of the connection pad 4b that are formed on the supporting piezoelectric substrate 3, the structure of the conductive bonding material 6 by which the electrode pad 7b and the electrode pad 4b are connected together, and the structure of the sealing member 5 are the same as those described with reference to FIG. 1 through FIG. 3, and therefore an overlapping description thereof is omitted.

In this pressure sensor device 1 provided with the acceleration sensor, one end side 36 of the pressure-detecting piezoelectric substrate 2 is extended from a pressure detecting area 14 outward, and an acceleration detecting element 21 is formed on the lower surface of the extended portion 36.

The acceleration detecting element 21 can detect acceleration based on the deformation of the acceleration detecting element 21 caused by the application of acceleration G.

The acceleration detecting element 21 is, like the surface acoustic wave element for pressure detection 7a, for example, is a surface acoustic wave element made of an IDT electrode and a pair of reflectors formed on each side in the propagating direction of the IDT electrode.

As shown in FIG. 6, the IDT electrode 26 is connected to an electrode pad 22 via a leader electrode 23. The electrode pad 22 is electrically connected to a connection pad 28 disposed on the supporting piezoelectric substrate 3 via a conductive bonding material 29. The electrode pad 22 and the leader electrode 23 can be produced by applying a pattern formation to a metallic material, such as aluminum or gold, according to a thin-film forming technique or a photolithography technique in the same way as the electrode pad 7b and the leader electrode that are formed around the surface acoustic wave element for pressure detection 7a mentioned above.

The detection sensitivity of acceleration G can be heightened by providing a weight 70 at the end of the acceleration detecting element 21. The weight 70 is formed by joining a plate or a layered structure made of, for example, metal or ceramic to the end of the extended portion 36 with an adhesive.

Preferably, a case 20 is provided so as to hermetically seal the surface acoustic wave element when the acceleration detecting element 21 is formed of the surface acoustic wave element as mentioned above. Thereby, the IDT electrode 26 can be prevented from being oxidized and corroded.

The width w2 of the short side of the extended portion 36 can be arbitrarily set. Advantageously, the extended portion 36 can be easily bent by the application of acceleration, and acceleration-detecting sensitivity can be heightened if the width w2 of the short side of the extended portion 36 is made thinner than the width w1 of a part on which the surface acoustic wave element for pressure detection 7a of the pressure-detecting piezoelectric substrate 2 is formed. Additionally, advantageously, a step of cutting the pressure-detecting piezoelectric substrate 2 can be omitted when the extended portion 36 is formed, and the production process of the pressure detecting device 1 can be simplified if the width w2 of the short side of the extended portion 36 is made equal to the width w1 of a part on which the surface acoustic wave element for pressure detection 7a of the pressure-detecting piezoelectric substrate 2 is formed.

As described above, since at least one end side of the pressure-detecting piezoelectric substrate 2 is extended outward in a state of being separated from the upper surface of the supporting piezoelectric substrate 3, and since the acceleration detecting element 21 is formed on the extended portion 36 in parallel with the surface acoustic wave element for pressure detection 7a, the number of components can be reduced without preparing another substrate for the acceleration detecting element 21, and the pressure sensor device 1 can be reduced in size and weight.

Additionally, since the surface acoustic wave element for pressure detection 7a and the acceleration detecting element 21 can be formed through the same production process, the pressure sensor device 1 is superior in productivity.

This pressure sensor device 1 is mounted on a mother substrate 10 as shown in FIG. 5.

An oscillating circuit 80, an acceleration detecting circuit 86 described later, a power supply control circuit 87, an antenna element 95, a power amplifier 91, etc., are mounted on the upper surface of the mother substrate 10.

Figure 7:
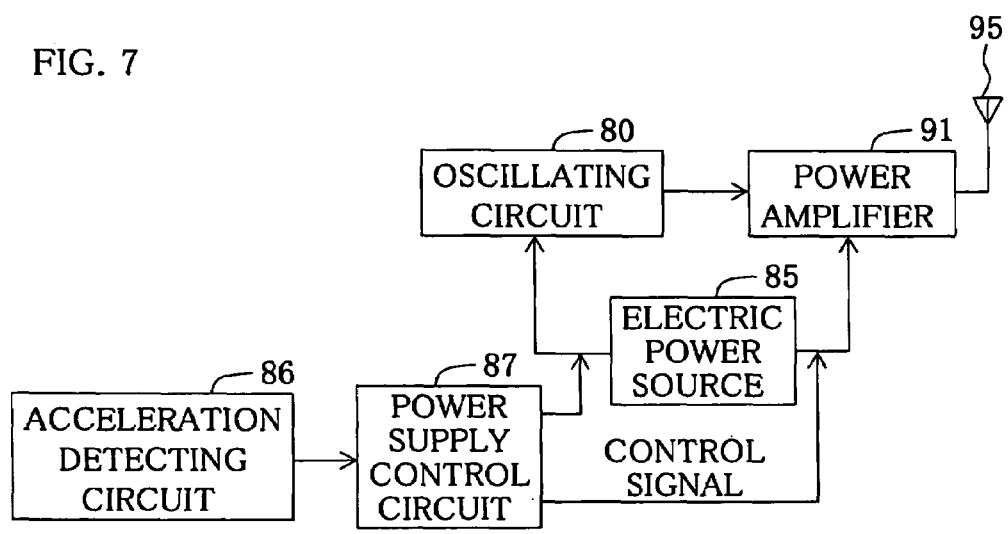
FIG. 7 is a circuit block diagram of the pressure sensor device.

FIG. 7 is a block circuit diagram showing a connection state among the oscillating circuit 80, the acceleration detecting circuit 86, the power supply control circuit 87, the antenna element 95, the power amplifier 91, etc.

The oscillating circuit 80 is made up of an IC integrated with a comparator, a calculation means, a memory means, and the like and passive components, such as a transistor for forming an oscillating circuit for pressure detection including a surface acoustic wave element 7a and an oscillating circuit for reference including a surface acoustic wave element 4a, a resistor and a condenser.

The oscillating circuit 80 compares an output signal from the oscillating circuit for pressure detection including the surface acoustic wave element 7a and the output signal from the oscillating circuit for reference including the surface acoustic wave element 4a to calculate and detect a pressure applied to the presser sensor device 1 as a pressure detection signal.

Further, an output signal from the oscillating circuit for reference is used as a carrier signal to wirelessly transmit to the outside. In this case, the pressure detection signal is modulated into the carrier wave to generate a high-frequency radio signal.

The acceleration detecting circuit 86 and the power supply control circuit 87 are electrically connected to the acceleration detecting element 21. The power amplifier 91 is connected to the antenna element 95 and to the oscillating circuit 80. Therefore, an oscillation signal output from the oscillating circuit 80 can be wirelessly transmitted to other receivers more reliably while increasing an output level of the oscillation signal.

Further, the power supply control circuit 87 is connected to the power amplifier 91, and an electric power supply from the electric power source 85 to the power amplifier 91 is controlled by the power supply control circuit 87. Therefore, the life of the electric power source can be lengthened while restricting the power consumption of the power amplifier.

The antenna element 95 is connected to the oscillating circuit 80 mentioned above. Accordingly, an electric signal having a predetermined frequency that is output from the oscillating circuit 80 can be wirelessly transmitted to other receivers, and pressure information can be obtained even at a place distant from the pressure sensor device 1. For example, a surface-mountable chip antenna that uses dielectric ceramic, etc., is used as the antenna element 95, and is mounted on the supporting piezoelectric substrate 3 by soldering.

Note that a description is given later with reference to FIG. 15 and FIG. 16 concerning an embodiment in which the antenna element 95 is formed on the upper surface of the pressure-detecting piezoelectric substrate 2.

Figure 8:
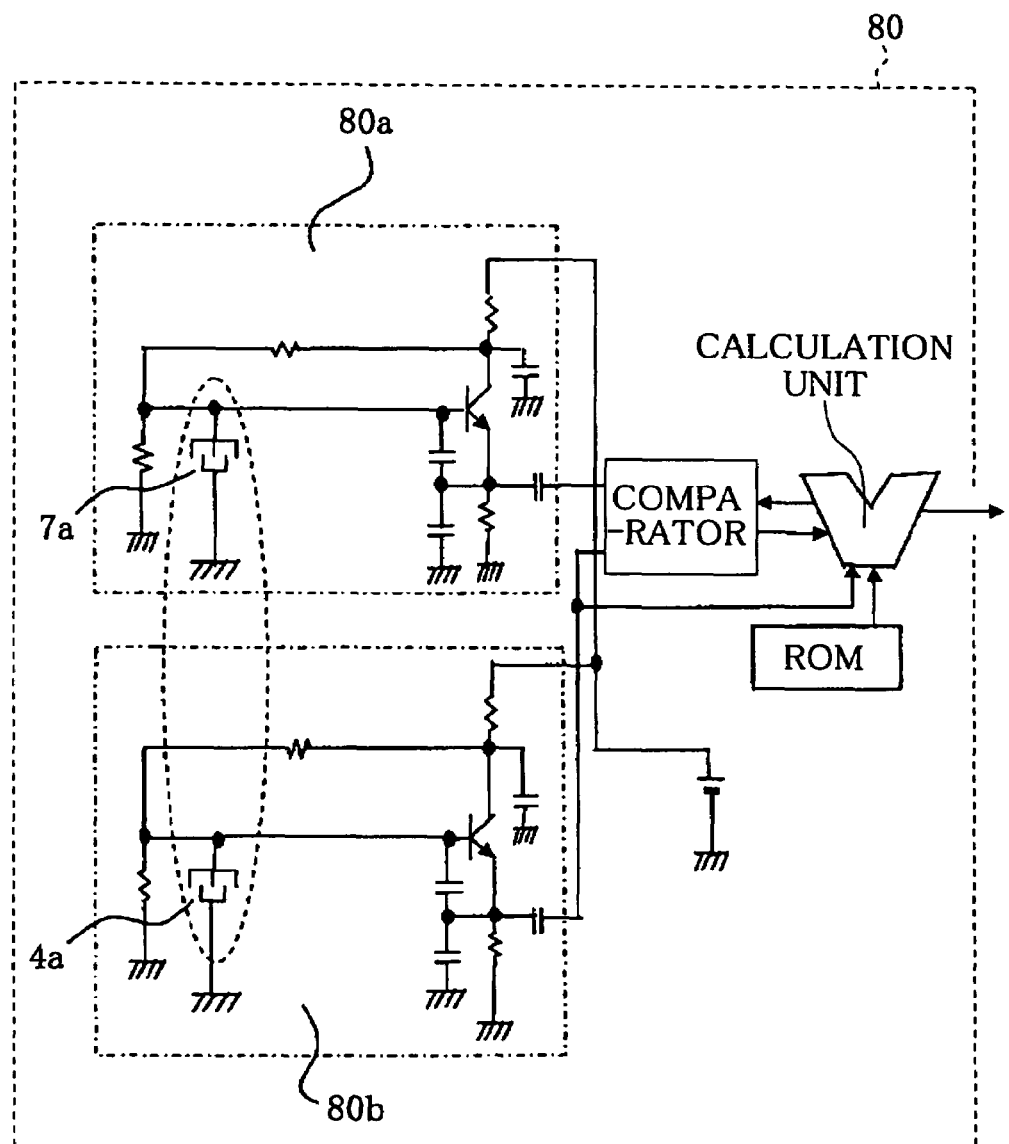
FIG. 8 is a circuit diagram showing an oscillating circuit used in the pressure sensor device.

FIG. 8 is a circuit diagram showing an example of the oscillating circuit 80. The circuit 80 is made up of an oscillating circuit for pressure detection 80a, an oscillating circuit for reference 80b, and a calculating circuit for detection.

First, the oscillating circuit for pressure detection 80a is made up of a surface acoustic wave element for pressure detection 7a formed on a pressure-detecting substrate 2, an oscillating transistor that arranges conditions for oscillation based on an output signal from the surface acoustic wave element 7a, a condenser, and an oscillating stage including a resistor.

The oscillating circuit for reference 80b is made up of a surface acoustic wave element for pressure detection 4a formed on a supporting piezoelectric substrate 3, an oscillating transistor that arranges conditions for oscillation based on an output signal from the surface acoustic wave element 4a, a condenser, and an oscillating stage including a resistor.

The calculating circuit for detection compares and refers the output signal of the surface acoustic wave element 7a obtained from the oscillating circuit for pressure detection 80a and the output signal of the surface acoustic wave element 4a obtained from the oscillating circuit for reference 80b at the comparator, for example. Then, the calculating circuit for detection passes the data thus obtained to a calculation unit. The unit modulates the pressure detection signal to a carrier wave to generate a high frequency signal for wireless transmission to the outside.

The oscillating signal of the predetermined oscillating frequency is obtained at the oscillating stage based on a resonance signal lead from the surface acoustic wave element for pressure detection 7a and the surface acoustic wave element for pressure detection 4a, as shown in FIG. 8. However, a resonance signal lead, not through the oscillating stage, but directly from the surface acoustic wave element may be used.

In the oscillating circuit 80 mentioned above, the comparator compares the output signal from the surface acoustic wave element for pressure detection 7a and the surface acoustic wave element for pressure detection 4a. However, a pressure detection signal based on these two output signals may be extracted by mixing the output signal of the surface acoustic wave element for pressure detection 7a and the output signal of the surface acoustic wave element for pressure detection 4a using a mixer and a bandpass-filter.

Further, in the above-mentioned circuit, the carrier wave for wireless transmission is generated based on the surface acoustic wave element for pressure detection 4a for reference to conduct the pressure detection. However, another oscillating circuit may be provided for generating a carrier wave except the oscillating circuit including the surface acoustic wave element for pressure detection 4a.

Figure 9:
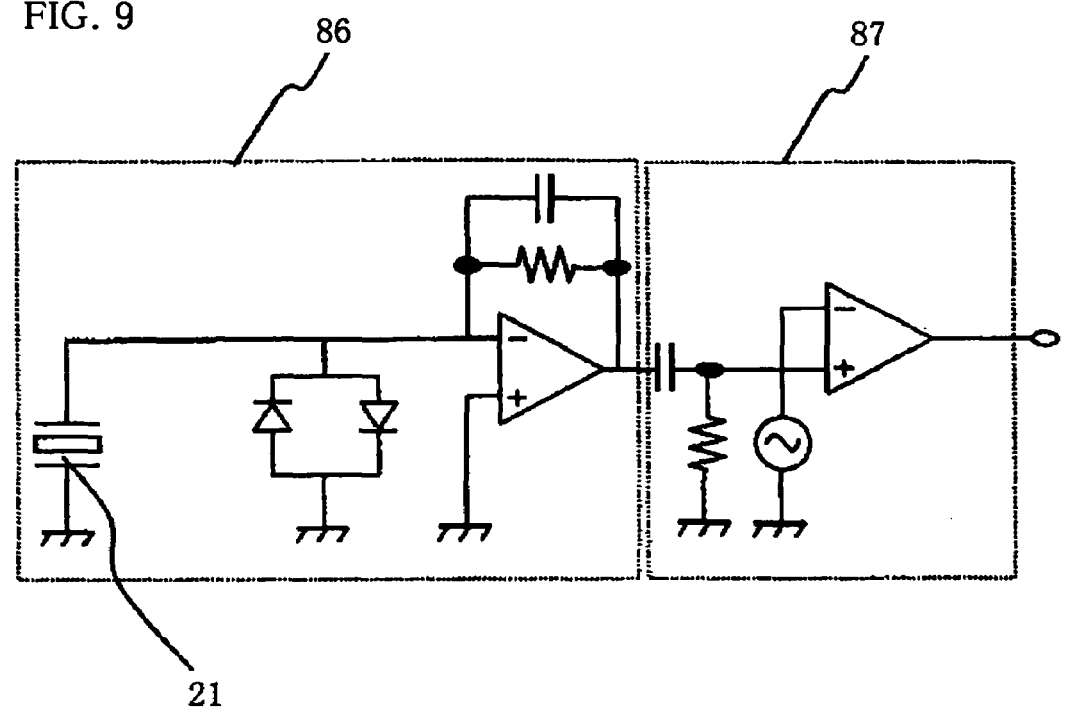
FIG. 9 is a circuit diagram showing an acceleration detecting circuit and a power supply control circuit used in the pressure sensor device.

FIG. 9 is a circuit diagram showing the acceleration detecting circuit 86 and the power supply control circuit 87. As shown in FIG. 9, the acceleration detecting circuit 86 is made up of the acceleration detecting element 21, a protection circuit consisting of a diode, and an arithmetic power amplifier. The power supply control circuit 87 is made up of a high-pass filter consisting of a condenser and a resistor, a comparative voltage source, and an arithmetic power amplifier.

Referring now to the circuit diagrams of FIG. 7, FIG. 8, and FIG. 9, a description will be given of an operation performed when acceleration and pressure are detected by use of the pressure sensor device 1 provided with the acceleration sensor. Herein, this description is given on the assumption that the pressure sensor device 1 is contained in a tire of a vehicle.

Figure 10:
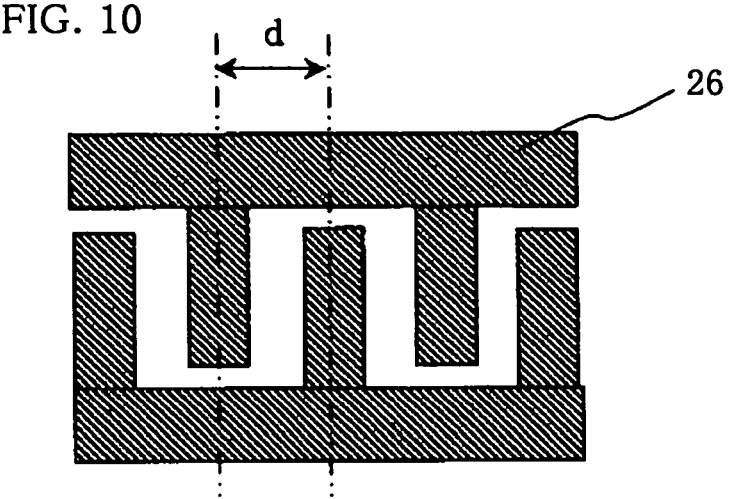
FIG. 10 is an enlarged view of an IDT electrode formed on the piezoelectric substrate.

First, an operation performed when acceleration is detected will be described. When the vehicle begins to travel, the rotational number of the tire increases, and acceleration G is generated by the rotation. When this acceleration G is applied to the acceleration detecting element 21, the bending moment acts on the acceleration detecting element 21 by a force acting on the extended portion 36 and on the weight 70. Accordingly, the acceleration detecting element 21 is bent, and the acceleration detecting element 21 is deformed. As a result, the propagation speed of a surface acoustic wave is changed by a change in the elastic constant of a part at which a deformation of the pressure-detecting piezoelectric substrate 2 has occurred, and the electrode finger array pitch d (see FIG. 10) of the IDT electrode 26 of the acceleration detecting element 21 varies, and, accordingly, the resonance frequency of the acceleration detecting element 21 is changed by both of the actions.

Thereupon, an electromotive force proportional to the variation quantity is generated, and, based on this electromotive force, acceleration is detected in the acceleration detecting circuit 86, and a control signal proportional to a change in resonance frequency or a change in impedance is obtained. When this control signal is input to the power supply control circuit 87, electric power is supplied from the electric power source 85, such as a battery, to the oscillating circuit 80 and the power amplifier 91 if the level of the control signal exceeds a threshold corresponding to a given traveling speed. If the level of the control signal is below the threshold, electric power cannot be supplied from the electric power source 85 to the oscillating circuit 80 and the power amplifier 91.

Therefore, electric power can be supplied only when the vehicle travels at a predetermined speed or more. This makes it possible to effectively restrict the power consumption of the pressure sensor device 1. The threshold of the control signal can be arbitrarily set by appropriately selecting circuit elements that constitute the power supply control circuit 87.

On the other hand, the pressure in the tire is detected in such a way as already described above. A description will be again given of this detection performed in the following way.

When the pressure in the tire varies because, for example, of air leakage from the tire, pressure being exerted on the pressure-detecting piezoelectric substrate 2 varies, and the surface acoustic wave element for pressure detection 7a is deformed. As a result, the propagation speed of a surface acoustic wave varies in accordance with a change in the elastic constant of a part where a distortion of the pressure-detecting piezoelectric substrate 2 has occurred, and the electrode finger array pitch d (see FIG. 10) of the IDT electrode of the surface acoustic wave element 7a varies, and, accordingly, the resonance frequency of the surface acoustic wave element 7a is changed by both of the actions. Since the oscillation frequency of the oscillating circuit 80a shown in FIG. 8 also varies in accordance with this, a fluctuation in the pressure exerted on the pressure-detecting piezoelectric substrate 2 is finally detected as a change in the oscillation frequency of the oscillating circuit 80a. An electric power supply to the oscillating circuit 80a is controlled by the power supply control circuit 87 as described above.

The surface acoustic wave element for pressure detection 7a formed on the pressure-detecting piezoelectric substrate 2 or the surface acoustic wave element for reference 4a formed on the supporting piezoelectric substrate 3 may be formed with a surface acoustic wave delay line that is constituted by the pair of IDT electrodes 4aa arranged with an interval and the propagation path 4af of a surface acoustic wave therebetween as shown in FIG. 4.

Likewise, the acceleration detecting element 21 formed on the pressure-detecting piezoelectric substrate 2 may be formed with a surface acoustic wave delay line that is constituted by the pair of IDT electrodes 4aa arranged with an interval and the propagation path 4af of a surface acoustic wave therebetween as shown in FIG. 4.

When the surface acoustic wave delay line is used in this way, pressure, which is to be applied from the outside, is applied from above to the pressure-detecting piezoelectric substrate 2. When the pressure-detecting piezoelectric substrate 2 is deformed, the length of the propagation path of a surface acoustic wave varies in the surface acoustic wave delay line, and the propagation speed of the surface acoustic wave of the part where a distortion has occurred varies, and, accordingly, the delay time of an electric signal is changed by both of the actions. Therefore, a pressure fluctuation can be detected by detecting a change in the delay time as in the above-described embodiment.

When acceleration G is applied to an acceleration detecting element formed with a surface acoustic wave delay line, the bending moment acts on the pressure-detecting piezoelectric substrate 2 by a force acting on the extended portion 36 and on the weight 70. The acceleration detecting element is bent thereby, and the surface acoustic wave element is deformed. As a result, when a distortion is produced by the application of stress to the propagation path of a surface acoustic wave of the surface acoustic wave element, the propagation speed of the surface acoustic wave varies in accordance with a change in the elastic constant of that part, and the length of the propagation path of the surface acoustic wave varies. Accordingly, the delay time of an electric signal is changed by both of the actions, and the oscillation frequency of the oscillating circuit varies in accordance therewith. Therefore, the acceleration detecting element formed with the surface acoustic wave delay line also functions as an acceleration detecting element in the same way as the acceleration detecting element 21 described in the above-described embodiment.

In the structure of FIG. 5, the acceleration detecting element 21 is formed only on the lower surface of the extended portion 36. Instead, the acceleration detecting element 21 may be formed on both of the upper and lower surfaces of the extended portion 36. An influence caused by a temperature change can be corrected by calculating a difference of the resonance frequencies between the two acceleration detecting elements 21 formed on both of the upper and lower surfaces of the extended portion 36, which improves detection sensitivity of the acceleration.

Next, a description will be given of a modification of the pressure sensor device 1 provided with the acceleration sensor of the present invention.

Figure 12:
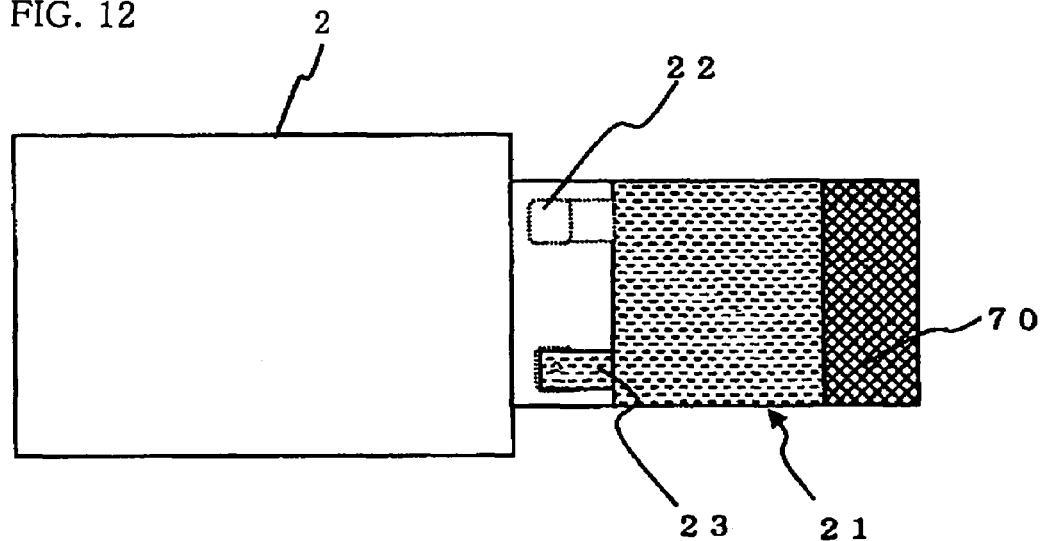
FIG. 12 is a plan view showing the upper surface of the pressure-detecting piezoelectric substrate 2 of the pressure sensor device.
Figure 13:
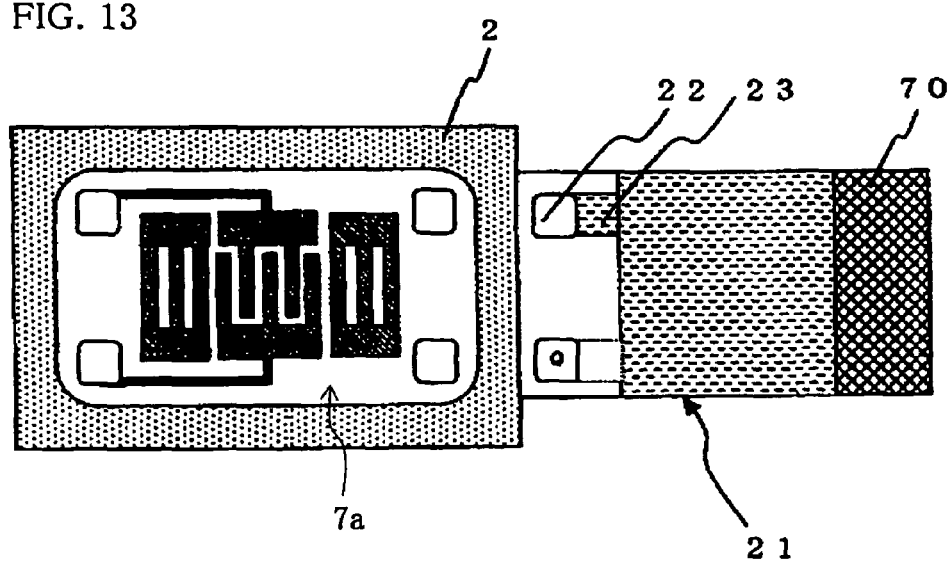
FIG. 13 is a plan view showing the lower surface of the pressure-detecting piezoelectric substrate 2 of the pressure sensor device.

FIG. 12 is a sectional view of the pressure sensor device 1 provided with the acceleration sensor of the present invention, FIG. 12 is a plan view showing the upper surface of the pressure-detecting piezoelectric substrate 2 used in the pressure sensor device 1 provided with the acceleration sensor, and FIG. 13 is a plan view showing the lower surface of the pressure-detecting piezoelectric substrate 2 used in the pressure sensor device 1 provided with the acceleration sensor. The same reference symbols are given to the same components as that of the pressure sensor device 1 provided with the acceleration sensor shown in FIG. 5, and a description thereof is omitted.

Figure 11:
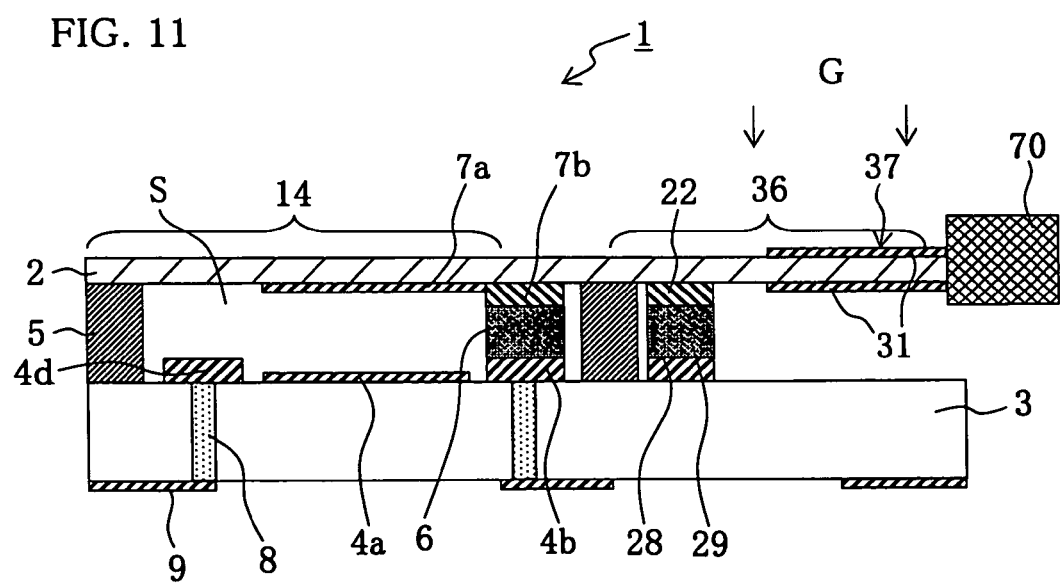
FIG. 11 is a sectional view of the pressure sensor device using another type of acceleration detecting sensor.

The pressure sensor device 1 shown in FIG. 11 is formed with a monomorph element 37 by replacing the acceleration detecting element 21 of the pressure sensor device 1 of FIG. 6 with an IDT electrode. The monomorph element 37 is to use bulk vibrations of the pressure-detecting piezoelectric substrate 2, and is formed by adhering an oscillatory electrode 31 onto each of the upper and lower surfaces of the extended portion 36 of the pressure-detecting piezoelectric substrate 2.

A metallic material, such as silver, is used for the oscillatory electrode 31. The oscillatory electrode 31 is formed according to, for example, a well-known film forming technique, such as a sputtering method or a vapor deposition method.

The bimorph type acceleration detecting element 21 detects acceleration as follows. First, when acceleration G is applied to the extended portion 36 and to the weight 70, the pressure-detecting piezoelectric substrate 2 is bent, and the monomorph element 37 formed on the extended portion 36 is deformed. As a result, an electromotive force proportional to the deformation of the monomorph element 37 is generated, whereby the acceleration can be detected.

If the acceleration detecting element 21 is formed with the monomorph element 37 as described above, the pattern shape thereof can be formed of a one color pattern, and, since hermetic sealing is not required, the pattern shape can be relatively easily formed, which contributes to the improvement of productivity of the piezoelectric sensor device 1.

In FIG. 11, the monomorph element 37 is formed by adhering the oscillatory electrodes 31 of the acceleration detecting element 21 to the upper and lower surfaces, respectively, of the extended portion 36. Instead, a bimorph element may be used for a multilayer structure.

A detailed description will now be given of a pressure sensor device 1 to which an antenna pattern is attached, with reference to the accompanying drawings.

Figure 14:
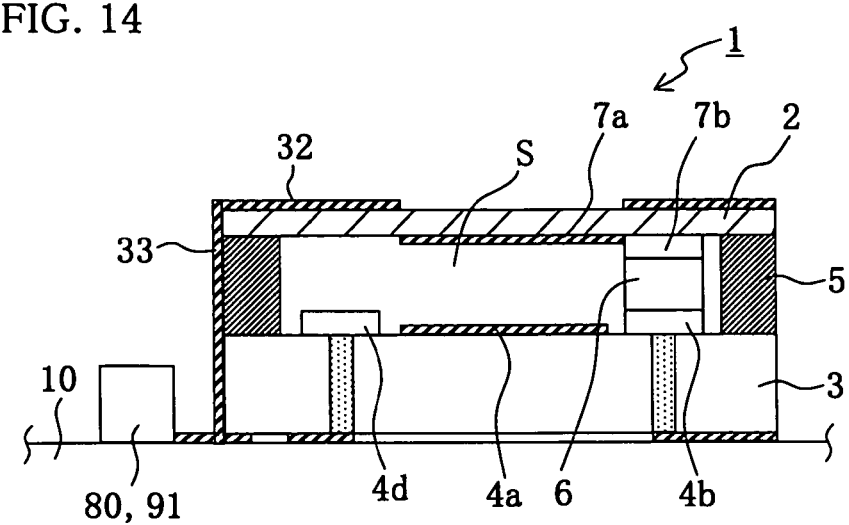
FIG. 14 is a sectional view of a pressure sensor device provided with an antenna pattern according to another embodiment of the present invention.
Figure 15:
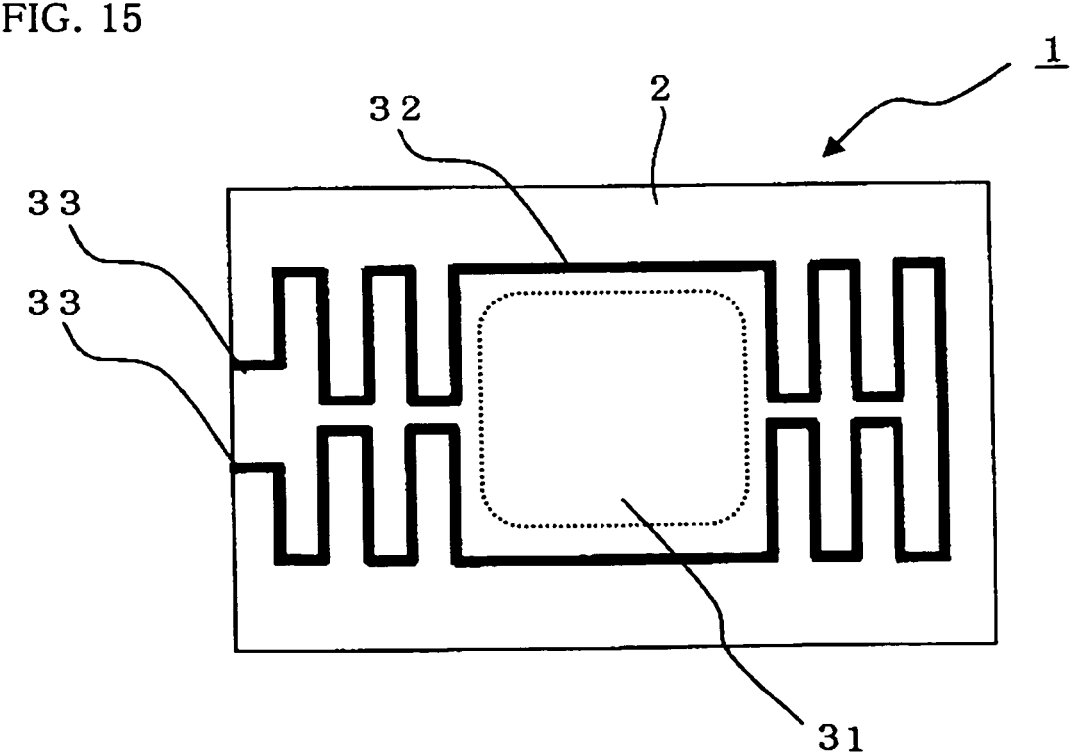
FIG. 15 is a plan view of an antenna pattern.
Figure 16:
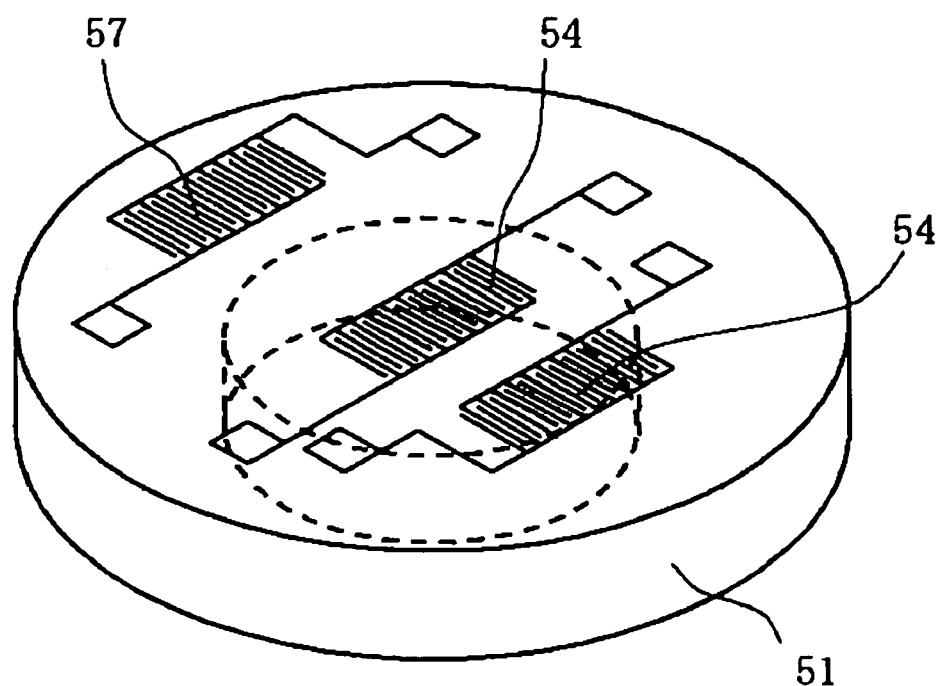
FIG. 16 is an external perspective view of a conventional pressure sensor device.
Figure 17:
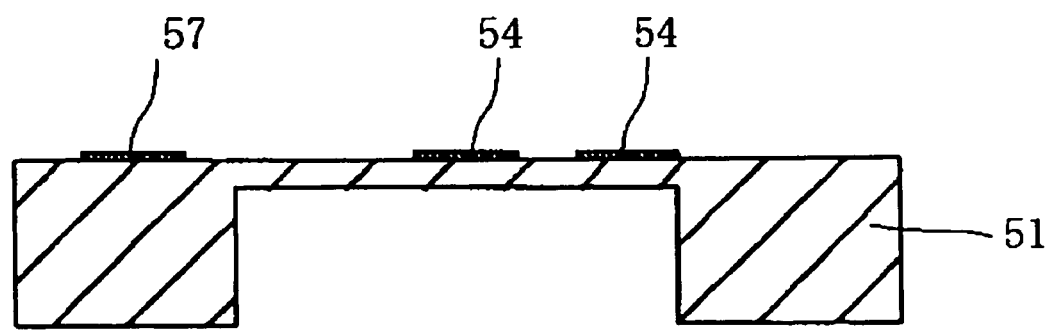
FIG. 17 is a sectional view of the conventional pressure sensor device.

FIG. 14 is a sectional view of a pressure sensor device 1 having an antenna pattern, and FIG. 15 is a plan view showing the upper surface of a sensor substrate used in the pressure sensor device 1 having an antenna pattern.

In this embodiment, only respects different from the embodiment of FIG. 1 through FIG. 3 mentioned above will be described, and the same reference symbols are given to the same constituent elements as in the embodiment of FIG. 1 through FIG. 3, and an overlapping description thereof is omitted.

The pressure sensor device 1 of this embodiment differs from the pressure sensor device 1 of FIG. 1 through FIG. 3 in the fact that the pressure sensor device 1 of this embodiment has an antenna pattern 32 on the upper surface of the pressure-detecting piezoelectric substrate 2.

This antenna pattern 32 is to wirelessly transmit an electric signal having a predetermined frequency, which is output from the oscillating circuit 80 and from the power amplifier 91, to other receivers.

As shown in FIG. 15, the antenna pattern 32 is meanderingly formed on the upper surface of the pressure-detecting piezoelectric substrate 2, excluding the area 31 just above the sensor part.

The pattern formation of the antenna pattern 32 is performed, for example, according to a thick-film printing method using a metallic material such as aluminum or copper foil. The antenna pattern 32 used here has a stroke width of about 100 µm and a film thickness of about 10 µm. The pattern length thereof is a length corresponding to about $\lambda/4$ or about $5\lambda/8$ of the wavelength of a frequency to be transmitted obtained by changing the number (length) of meanderings of the pattern.

An electric supply line 33 is formed on the side face of the pressure sensor device 1. The electric supply line 33 extends to the bottom surface of the pressure sensor device 1 along the side face of the pressure sensor device 1. The electric supply line 33 is connected to a predetermined terminal of the mother substrate 10 on which the pressure sensor device 1 is mounted.

The acceleration detecting circuit 86, the power supply control circuit 87, and the power amplifier 91, as well as the oscillating circuit 80, are mounted on the upper surface of the mother substrate 10.

A sealing member 5 is interposed between the supporting piezoelectric substrate 3 and the pressure-detecting piezoelectric substrate 2 in such a way as to encircle the surface acoustic wave element for reference 4a, the surface acoustic wave element for pressure detection 7a, the connection pad 4b, and the electrode pad 7b. The sealing member 5 may be made of resin, but, preferably, the sealing member 5 is made of a conductive material such as a solder, in order to produce a shielding effect by which unnecessary noise from the outside is cut off and in order to produce excellent heat conduction between the surface acoustic wave element for pressure detection 7a and the surface acoustic wave element for reference 4a.

However, if a conductive material is used for the sealing member 5, a short circuit between the sealing member 50 and the electric supply line 33 must be prevented by forming insulating resin or the like between the sealing member 5 and the electric supply line 33 formed on the side face of the pressure sensor device 1.

In the pressure sensor device 1 of this embodiment, the electric supply line 33 by which the electronic parts, such as the oscillating circuit 80 and the power amplifier 91, and the antenna pattern 32 are connected together can be shortened by disposing these close to each other. Therefore, an electric signal output from the oscillating circuit 80 can be transmitted almost without attenuating it while eliminating the influence of transmission loss caused by the wiring portion as much as possible. Additionally, since the power consumption of a battery can be reduced, the life of the battery used in the module of the pressure sensor device 1 can be lengthened.

Additionally, since the antenna pattern 32 is meanderingly formed on the upper surface of the pressure-detecting piezoelectric substrate 2 excluding the area 31 just above the sensor part, there is no need to prepare another substrate for the antenna. Therefore, the number of components can be reduced, and the pressure sensor device 1 can be reduced in size and weight.

In this embodiment, the meandering loop type antenna is formed for the antenna pattern 32 on the upper surface of the pressure-detecting piezoelectric substrate 2, and in place of this, a dipole type antenna element may be formed.

Without being limited to the above-described embodiment, the present invention can be variously modified or changed within the scope not departing from the gist of the present invention.

For example, in the above-described embodiment, the single-crystal piezoelectric material is used for the two piezoelectric substrates. However, instead of this, a polycrystalline piezoelectric material may be used. In particular, in this case, the supporting piezoelectric substrate 3 and the pressure-detecting piezoelectric substrate 2 are shaped rectangularly, and are made of piezoelectric polycrystal shaving the same composition. Further, the thermal expansion coefficient in the longitudinal direction of the two piezoelectric substrates is set to be substantially the same (i.e., exactly the same and the same within a range of ±10%). Therefore, it is possible to effectively prevent the occurrence of a defect, such as a crack, caused by a large stress generated in the joint portion resulting from a difference in the thermal expansion coefficient when a large change in temperature occurs, for example, by mounting the pressure-detecting piezoelectric substrate 2 on the supporting piezoelectric substrate 3.

Additionally, in this case, if the propagating directions of surface acoustic waves with respect to the polarization direction of the supporting piezoelectric substrate 3 and the pressure-detecting piezoelectric substrate 2 are caused to coincide with each other between the surface acoustic wave element for pressure detection 7a and the surface acoustic wave element for reference 4a, the two surface acoustic wave elements can be caused to coincide with each other in temperature characteristics, and temperature compensation can be performed by a simple method as in the above-described embodiment.

Additionally, in this embodiment, the surface acoustic wave element for pressure detection 7a is formed on the lower surface of the pressure-detecting piezoelectric substrate 2. Instead, the surface acoustic wave element for pressure detection 7a may be formed on the upper surface of the pressure-detecting piezoelectric substrate 2.

Additionally, in this embodiment, both the surface acoustic wave element forming the surface acoustic wave element for pressure detection 7a and the surface acoustic wave element forming the acceleration detecting element 21 are surface acoustic wave delay lines. However, only one of the elements may be a surface acoustic wave delay line. If so, it is recommended to use the other surface acoustic wave element as a surface acoustic wave resonator made up of an IDT electrode and a reflector electrode.

Moreover, the present invention can be embodied in other various forms without departing from the scope thereof.

What is claimed is:

1. A pressure sensor device with surface acoustic wave elements comprising:

a first piezoelectric substrate having a surface acoustic wave element for reference formed on an upper surface thereof;

a second piezoelectric substrate that is thinner in thickness than the first piezoelectric substrate and having a surface acoustic wave element for pressure detection formed on a lower surface thereof; and a sealing member to be joined to the upper surface of the first piezoelectric substrate and to the lower surface of the second piezoelectric substrate so as to form a space enclosed by the sealing member between the first piezoelectric substrate and the second piezoelectric substrate, wherein the sealing member is made of a conductive material and is electrically connected to a ground terminal provided on the first piezoelectric substrate.

2. The pressure sensor device with surface acoustic wave elements as set forth in claim 1, wherein the elements are disposed so that at least a part of the surface acoustic wave element for reference is opposed to the surface acoustic wave element for pressure detection.

3. The pressure sensor device with surface acoustic wave elements as set forth in claim 1, wherein thermal expansion coefficients of both of the piezoelectric substrates in at least one direction are substantially the same.

4. The pressure sensor device with surface acoustic wave elements as set forth in claim 1, wherein the both piezoelectric substrates are made of piezoelectric single crystals having the same composition, and cut angles of both of the piezoelectric substrates and propagating directions of surface acoustic waves with respect to the crystal axis of the piezoelectric single crystal are substantially the same or are crystallographically equivalent to each other.

5. The pressure sensor device with surface acoustic wave elements as set forth in claim 1, comprising an antenna pattern formed on the first piezoelectric substrate or on the second piezoelectric substrate and electrically connected to an oscillating circuit for emitting a predetermined electric signal based on pressure information from the surface acoustic wave elements for reference and pressure detection.

6. The pressure sensor device with surface acoustic wave elements as set forth in claim 5, wherein the antenna pattern is adhered to the upper surface of the second piezoelectric substrate.

7. The pressure sensor device with surface acoustic wave elements as set forth in claim 6, wherein the antenna pattern is formed in an area excluding an area immediately above the surface acoustic wave element for pressure detection.

8. The pressure sensor device with surface acoustic wave elements as set forth in claim 5, wherein the antenna pattern is meanderingly shaped.

9. The pressure sensor device with surface acoustic wave elements comprising:
   a first piezoelectric substrate having a surface acoustic wave element for reference formed on an upper surface thereof;
   a second piezoelectric substrate that is thinner in thickness than the first piezoelectric substrate and having a surface acoustic wave element for pressure detection formed on a lower surface thereof;
   a sealing member to be joined to the upper surface of the first piezoelectric substrate and to the lower surface of the second piezoelectric substrate so as to form a space enclosed by the sealing member between the first piezoelectric substrate and the second piezoelectric substrate;
   an electrode pad electrically connected to the surface acoustic wave element for pressure detection, the electrode pad being provided on the lower surface of the second piezoelectric substrate within the space enclosed by the sealing member; and
   a connection pad electrically connected to the electrode pad via a conductive bonding material, the connection pad being provided on the upper surface of the first piezoelectric substrate inside the sealing member.

10. The pressure sensor device with surface acoustic wave elements comprising:
    a first piezoelectric substrate having a surface acoustic wave element for reference formed on an upper surface thereof;
    a second piezoelectric substrate that is thinner in thickness than the first piezoelectric substrate and having a surface acoustic wave element for pressure detection formed on a lower surface thereof; a sealing member to be joined to the upper surface of the first piezoelectric substrate and to the lower surface of the second piezoelectric substrate so as to form a space enclosed by the sealing member between the first piezoelectric substrate and the second piezoelectric substrate;
    an extended portion formed by extending one end of one of the both piezoelectric substrates while the end is disposed apart from the other piezoelectric substrate; and
    an acceleration detecting element for detecting an acceleration disposed on the extended portion.

11. The pressure sensor device with surface acoustic wave elements as set forth in claim 10, wherein the extended portion is formed on the second piezoelectric substrate.

12. The pressure sensor device with surface acoustic wave elements as set forth in claim 10, comprising:
    an oscillating circuit for emitting a pressure detection signal based on output signals from the surface acoustic wave elements for pressure detection and for reference to outside;
    an acceleration detecting circuit for emitting a predetermined electric signal based on an acceleration detection signal from the acceleration detecting element;
    a power supply means for supplying electric power to the oscillating circuit; and
    a power supply control circuit for controlling an electric power supply from the power supply means to the oscillating circuit;
    wherein the power supply control circuit controls an electric power supply from the power supply means based on whether the acceleration has exceeded a threshold value or not.

13. The pressure sensor device with surface acoustic wave elements as set forth in claim 10, wherein the acceleration detecting element is formed of a surface acoustic wave element.

* * * * *